United States Patent
Cohen-Or et al.

(10) Patent No.: US 9,734,638 B2
(45) Date of Patent: Aug. 15, 2017

(54) THREE-DIMENSIONAL MODELING FROM SINGLE PHOTOGRAPHS

(71) Applicant: Ramot at Tel-Aviv University Ltd., Tel-Aviv (IL)

(72) Inventors: Daniel Cohen-Or, Hod-HaSharon (IL); Ariel Shamir, Jerusalem (IL); Tao Chen, Shandong (CN)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 452 days.

(21) Appl. No.: 14/177,359

(22) Filed: Feb. 11, 2014

(65) Prior Publication Data

US 2014/0229143 A1    Aug. 14, 2014

Related U.S. Application Data

(60) Provisional application No. 61/763,005, filed on Feb. 11, 2013.

(51) Int. Cl.
*G06F 17/50* (2006.01)
*G06T 19/20* (2011.01)
*G06T 17/10* (2006.01)

(52) U.S. Cl.
CPC ............ *G06T 19/20* (2013.01); *G06T 17/10* (2013.01); *G06T 2200/08* (2013.01); *G06T 2219/2021* (2013.01)

(58) Field of Classification Search
CPC ............... G06T 17/10; G06T 2200/08; G06T 2219/2021; G06T 19/20
See application file for complete search history.

(56) References Cited

PUBLICATIONS

Yotam Gingold et al., "Structured Annotations for 2D-to-3D Modeling," 2009, ACM Transactions on Graphics, vol. 28, No. 5, pp. 1-9.*
Alexis Andre et al., "Single-View Sketch Based Modeling," 2011, Eurographics Symposium on Sketch-Based Interfaces and Modeling, pp. 133-140.*
Manfred Lau et al., "Modeling-in-context: user design of complementary objects with a single photo," 2010, Eurographics Symposium on Sketch-Based Interfaces and Modeling, pp. 17-24.*
Joao P. Pereira et al., "Calligraphic Interfaces: Mixed Metaphors for Design," 2003, Springer-Verlag, pp. 154-170.*

(Continued)

*Primary Examiner* — Kamini S Shah
*Assistant Examiner* — Russ Guill

(57) ABSTRACT

A method of obtaining a three-dimensional digital model of an artificial object, made up of a plurality of geometric primitives, the artificial object being in a single two-dimensional photograph, the method comprising: using edge detection to define a two-dimensional outline of the artificial object within the photograph; interactively allowing a user to define two-dimensional profiles of successive ones of the geometric primitives; interactively allowing a user to sweep respective profiles over an extent of a corresponding one of the geometric primitives within the image; generating successive three-dimensional model parts from existing detected edges of the corresponding geometric primitives and the sweeping of the respective profile; and aligning the plurality of three-dimensional model parts to form the three-dimensional model.

17 Claims, 12 Drawing Sheets
(11 of 12 Drawing Sheet(s) Filed in Color)

(56) References Cited

PUBLICATIONS

Amit Shesh et al., "3D-Aware editing for out of bounds photography," 2009, Graphics Interface Conference, pp. 47-54.*

Yangyan Li et al., "GlobFit: Consistently fitting primitives by discovering global relations," 2011, ACM Transactions Graphics, vol. 30, No. 4, pp. 1-11.*

Masayuki Mukunoki et al., "3D Model Generation from Image Sequences Using Global Geometric Constraint," 2005, Springer-Verlag, pp. 470-477.*

Min Sun et al., "Toward automatic 3d generic object modeling from one single image," 2011, 2011 Conference on 3d Imaging, Modeling, Processing, Visualization and Transmission, pp. 9-16.*

Michael Kedzierski et al., "Application of digital camera with fisheye lens in close range photogrammetry," 2009, ASPRS 2009 Annual Conference, seven pages.*

Takeo Igarashi et al., "Teddy: a sketching interface for 3d freeform design," 1999, SIGGRAPH 99, ACM, pp. 409-416.*

Pablo Arbelaez et al., "Contour Detection and Hierarchical Image Segmentation," 2011, IEEE Transactions on Pattern Analysis and Machine Intelligence, vol. 33, No. 5, pp. 898-916.*

Paul E. Debevec et al., "Modeling and Rendering Architecture from Photographs: A hybrid geometry-and image-based approach," 1996, SIGGRAPH '96 Proceedings of the 23rd annual conference on Computer graphics and interactive techniques, pp. 11-20.*

Sudipta N. Sinha et al., "Interactive 3d Architectural modeling from unordered photo collections," 2008, ACM Transactions on Graphics, vol. 27, No. 5, Article 159, pp. 1-10.*

Diego Gonzalez-Aguilera et al., "An automatic approach for radial lens distortion correction from a single image," 2011, IEEE Sensors Journal, vol. 11, issue 4, pp. 956-965.*

Jong-Seung Park, "Interactive 3D reconstruction from multiple images: a primitive-based approach," 2005, Pattern Recognition Letters, vol. 26, pp. 2558-2571.*

* cited by examiner

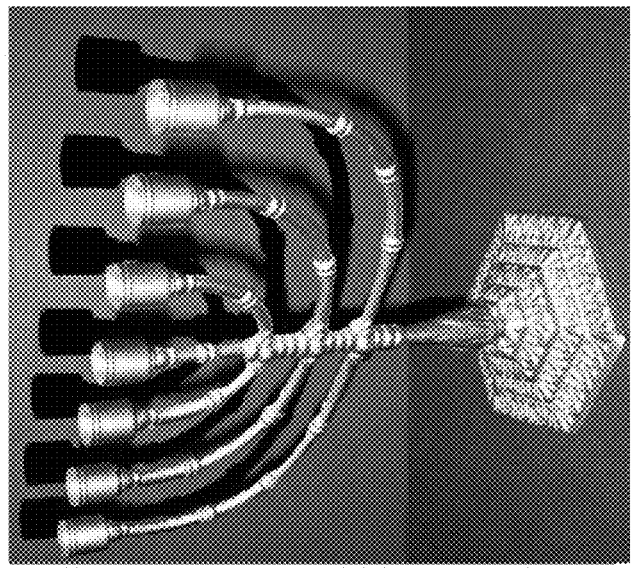
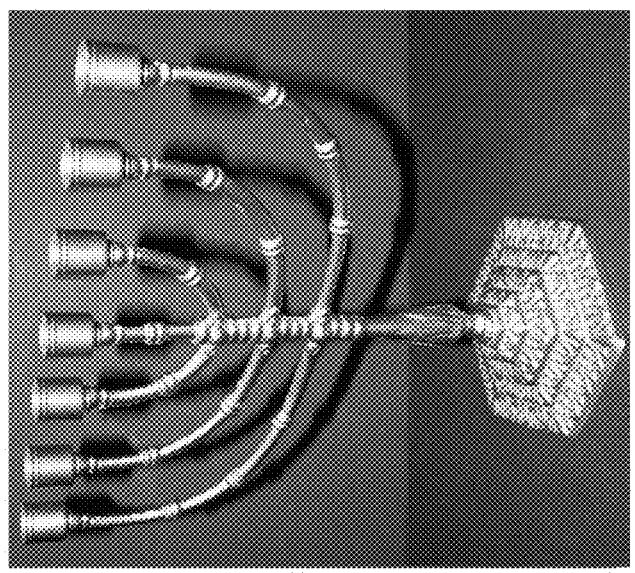
Fig. 1B

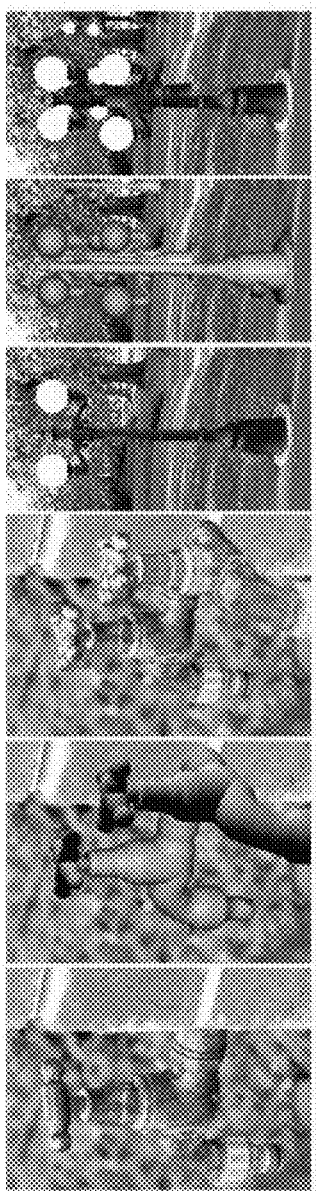
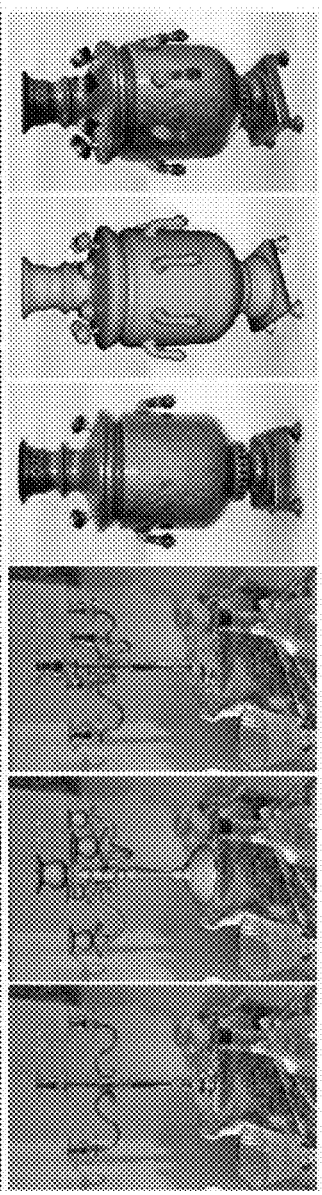
Fig. 9: Modeling and replication pass for image editing. Orange parts are replicated or deformed.
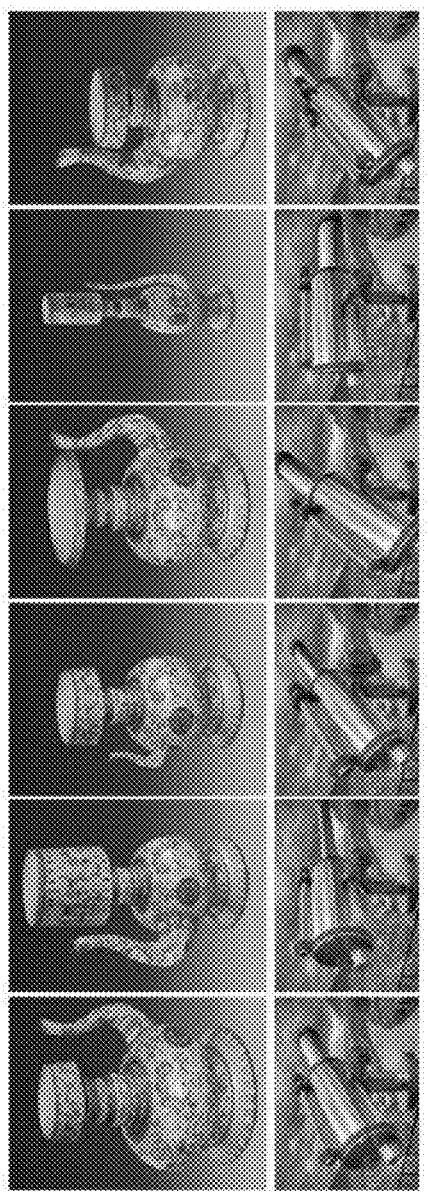
Fig. 10

THREE-DIMENSIONAL MODELING FROM SINGLE PHOTOGRAPHS

RELATED APPLICATION

This application claims the benefit of priority under 35 USC 119 (e) of U.S. Provisional Patent Application No. 61/763,005 filed Feb. 11, 2013, the contents of which are incorporated herein by reference in their entirety.

FIELD AND BACKGROUND OF THE INVENTION

The present invention, in some embodiments thereof, relates to three-dimensional modeling from single photographs and, more particularly but not exclusively to modeling of manmade objects with straightforward geometry.

The creation and modeling of 3D objects has always been a difficult task even for professionals. First, a mental idea of what the model should look like needs to be formed. This conceptual stage requires creativity and inspiration. Then, the idea needs to be implemented by a series of actions using various geometric modeling tools. These steps take time, demand very high proficiency, and a fair amount of skill. By modeling objects from existing photographs one can first alleviate the mental stage. Second, it allows much simpler modeling that can also borrow textures from the image. This forms at least an initial base model that can later be edited and refined. In addition, such abilities can be utilized for manipulating the images themselves using 3D. An example of a suitable object is shown in FIG. 1, in which the left image shows the object, and the right image shows the object after minor rotation. The result is to leave a black hole in the image.

Extracting three dimensional models from a single photo is still a long way from realization at the current state of technology, as it involves numerous complex tasks: the target object must be separated from its background, and its 3D pose, shape and structure should be recognized from its projection. These tasks are difficult since they require some degree of semantically understanding the object. To alleviate this problem, complex 3D models can be partitioned into simpler parts, but identifying object parts also requires semantic understanding and is difficult to perform automatically. Moreover, once decomposing a 3D shape to parts, the relations between these parts should also be understood and maintained in the final composition.

RELATED WORK

3D Modeling from a Single Photo. Images have always been an important resource and were used as references in 3D modeling. There are numerous techniques that model shapes from multiple images [26, 28]. However, modeling from a single photograph is more challenging since there is more ambiguity in the observed geometry. Methods to reconstruct an object from a single image usually require some degree of manual intervention. Oh et al. [23] allow the annotation of depth and layer information in a single image and yield impressive image editing at the scene level. Russell et al. [25] build a manually annotated database of 3D scenes to assist recovering scene-level geometry and camera pose. Lau et al. [19] introduced a "Modeling-in-context" concept, allowing complementary objects of a photograph to fit better to other objects in the photo. Jiang et al. [15] recover an architectural model heavily relying on the symmetry of such buildings.

Of particular significance is the work of Xu et al. [30] which models a man-made object observed in a single photograph. Their method relies on matching and warping an existing 3D object to the observed object in the photograph. The warp is constrained by semantic geometric (geo-semantic) constraints. However, the success of their method strongly depends on the existence, and retrieval, of a similar 3D shape.

The task of 3D modeling from a single image is closely related to the endeavor of reconstructing a 3D shape from a sketch [24]. A number of interactive systems have been developed for this purpose [13, 14, 16, 34, 32]. Free-sketched objects however do not necessarily correspond to real man-made objects that may appear in photographs, and there remain problems with modeling such man-made objects, which typically consist of a composition of primitives with certain inter-relations among the components [9, 21], which the systems aimed at free sketches do not approach.

Part-based Modeling. Part-based snapping techniques have been used for modeling 3D objects from sketches. Gingold et al. [10] introduce an interface to generate 3D models from 2D drawings by manually placing 3D primitives. Tsang et al. [29] use a guiding image to assist sketch-based modeling, the user's input curves can snap to the image and then the user is provided with suggestions for curve completion from a curve database. Recently, Shtof et al. [27] have modeled 3D objects from sketches by snapping primitives. In their system, the user drags-and-drops an entire 3D primitive onto its place. Since the fitting problem is ambiguous, the silhouettes of the sketches must be semantically labeled, and the sketch is expected to contain some cues that indicate the part boundaries.

Sweep-Based Modeling. Sweep based models have been studied extensively in Computer-Aided Design. Choi and Lee [7] model sweep surfaces by using coordinate transformations and blending. Swirling-Sweepers [1] is a volume preserving modeling technique capable of unlimited stretching, avoiding self-intersection. Hyun et al. [12] and Yoon et al. [33] use sweeping for human and freeform deformation, respectively. Many CAD works also aim at modeling generalized primitives. Kim et al. [17] model and animate generalized cylinders by a translational sweep along the spine or rotational sweep around the spine. Lee [20] models generalized cylinders using direction map representation. Based on generalized cylinder, Murugappan et al. [22] propose an interesting interaction approach to create 3D shapes by hand gestures. None of these methods have been applied for modeling from photographs or sketches.

Semantic Constraints. Gal et al. [9] have introduced a 3D deformation method while preserving some semantic constraints among the object's parts. Such geo-semantic constraints [35] have been shown to be useful to quickly edit or deform man-made models [30, 31]. Li et al [21] and Shtuf et al. [27] reconstruct 3D shapes while simultaneously inferring the global mutual geo-semantic relations among their parts.

Object-Level Image Editing. Unlike traditional image-based editing, object-based editing allows high-level operations. Operating on the object-level requires extensive user interaction [8, 5] or massive data collection [18, 11]. Barrett et al. [4] use wrapping to achieve object-based editing, which is restricted to 3D rotation. Zhou et al. [37] fit a semantic model of a human to an image, allowing an object-based manipulation of a human figure in photographs. Recently, Zheng et al. [36] have proposed using cuboid proxies for semantic image editing. Man-made objects are modeled by a set of cuboid proxies, possibly together with some geometric relations or constraints, allowing their manipulation in the photo.

SUMMARY OF THE INVENTION

The present embodiments provide a method and apparatus for extracting three-dimensional information of objects in single photographs by providing a user with interactivity to draw a cross-section for a part of the object and then sweep the cross section over the part of the object to which it applies. Unlike certain of the above cited works, the present embodiments may focus on the modeling of a single subject that is observed in a photograph and not the whole scene.

The computer then fits the cross-section to the object outline of which it is aware and once all parts of the object have been addressed in this way the computer is able to generate a three-dimensional model of the object, which can then be rotated, or used in animations or in any other way.

Thus, in the present embodiments, the original object is not restricted, as with Xu et al, to prestored shapes. Rather, the embodiments work on geometric primitives, so that any shape that can be deconstructed into geometric primitives can be reconstructed into a 3D object. The reconstructed object is thus composed of these generic primitives, providing larger scope and flexibility.

The prior art teaches snapping, and separately teaches sweeping. The present embodiments combine sweeping and snapping to provide automatic alignment of the primitives into an overall object.

According to an aspect of some embodiments of the present invention there is provided a method of obtaining a three-dimensional digital model of an artificial object made up of a plurality of geometric primitives, the artificial object being in a single two-dimensional photograph, the method comprising:

defining a two-dimensional outline of the artificial object within the photograph;

interactively allowing a user to define cross-sectional profiles of successive ones of the geometric primitives, the cross-sectional profiles defining a third dimension;

interactively allowing a user to provide sweep input to sweep respective defined cross-sectional profiles over an extent of a corresponding one of the geometric primitives within the image, the sweeping generating successive three-dimensional model primitives from existing detected edges of the corresponding geometric primitives and the sweeping of the respective profile; and aligning the plurality of three-dimensional model primitives to form the three-dimensional model.

The method may comprise interactively allowing the user to explicitly define three dimensions of the geometric primitive using three sweep motions, wherein a first two of the three sweeps define a first and second dimension of the cross-sectional profile and a third sweep defines a main axis of the geometric primitive.

The method may comprise, upon the user sweeping the two-dimensional profile over a respective one of the geometric primitives, dynamically adjusting the two-dimensional profile using a pictorial context on the photograph and automatically snapping photograph lines to the profile.

In an embodiment, the snapping allows the three-dimensional model to include three-dimensional primitives that adhere to the object in the photographs, while maintaining global constraints between the plurality of three-dimensional model primitives composing the object.

The method may comprise optimizing the global constraints while taking into account the snapping and the sweep input.

The method may comprise a post snapping fit improvement of better fitting the primitive to the image, the better fitting comprising searching for transformations within ±10% of primitive size, that create a better fit of the primitive's projection to the profile.

In an embodiment, the defining the two dimensional outline comprises edge detecting.

An embodiment may comprise estimating a field of view angle from which the photograph was taken in order to estimate and compensate for distortion of the primitives within the photograph.

An embodiment may comprise using relationships between the primitives in order to define global constraints for the object.

An embodiment may comprise obtaining geo-semantic relations between the primitives to define the three-dimensional digital model, and encoding the relations as part of the model.

An embodiment may comprise inserting the three-dimensional digital model into a second photograph.

The method may comprise extracting a texture from the photograph and applying the texture to sides of the three-dimensional model not visible in the photograph.

In an embodiment, the defining the cross-sectional profiles comprises defining a shape and then distorting the shape to correspond to a three-dimensional orientation angle.

The method may comprise applying different constraints to different parts respectively of a given one of the geometric primitives, or locally modifying different parts respectively of a given one of the geometric primitives.

The method may comprise snapping the first two user sweep motions to the photograph lines, using the endpoints of the first two user sweep motions along with an anchor point on a respective primitive to create three-dimensional orthogonal system for a respective primitive.

The method may comprise supporting a constraint, the constraint being one member of the group consisting of: parallelism, orthogonality, collinear axis endpoints, overlapping axis endpoints, coplanar axis endpoints and coplanar axes, and for the member testing whether a pair of components is close to satisfying the member, and if the member is satisfied or close to satisfied then adding the constraint to a respective one of the primitives.

In the method, aligning the three dimensional primitives may comprise finding an initial position for all primitives together by changing only their depth to adhere to geo-semantic constraints, followed by modifying shapes shape of the primitives.

The present embodiments may include a user interface for carrying out the above method. The user interface may comprise an outline view of a current photograph on which view to carry out interactive sweeping to define cross sections of respective primitives and on which to snap the cross-sections. The user interface may further comprise a solid model view and a texture view respectively of the current photograph, and selectability for user selection between different basic cross-sectional shapes.

According to a second aspect of the present invention there may be provided a method of digitally forming a three-dimensional geometric primitive from a two-dimensional geometric primitive from a two-dimensional photograph, comprising:

interactively obtaining user input to draw a two-dimensional cross section of the primitive and then using further user input to sweep the cross-section over a length of the primitive.

A geometric primitive is a part of an object whose cross section does not change, or which does not change discontinuously. That is to say the part is a geometric primitive if it has a cross section that remains constant or changes continuously along the length of the part.

According to a third aspect of the present invention there is provided a method of forming a derivation of a photograph, the photograph incorporating a two dimensional representation of a three-dimensional object, the two-dimensional representation being a rotation of an original two-dimensional representation, the rotation being formed by:

carrying out the method described hereinabove to form a three-dimensional model of the original two-dimensional representation;

rotating the three-dimensional model; and projecting the rotated three-dimensional model onto a two-dimensional surface to form the derivation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. The data processor may include a volatile memory for storing instructions and/or data and/or a non-volatile storage, for example, a magnetic hard-disk, flash memory and/or removable media, for storing instructions and/or data. A network connection may be provided and a display and/or a user input device such as a keyboard or mouse may be available as necessary.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1A is a simplified flow chart illustrating a procedure for forming a 3D model from a single 2D photograph according to an embodiment of the present invention;

FIG. 1B is a simplified diagram showing an object being extracted from a 2D photograph for modeling;

Figure 4:
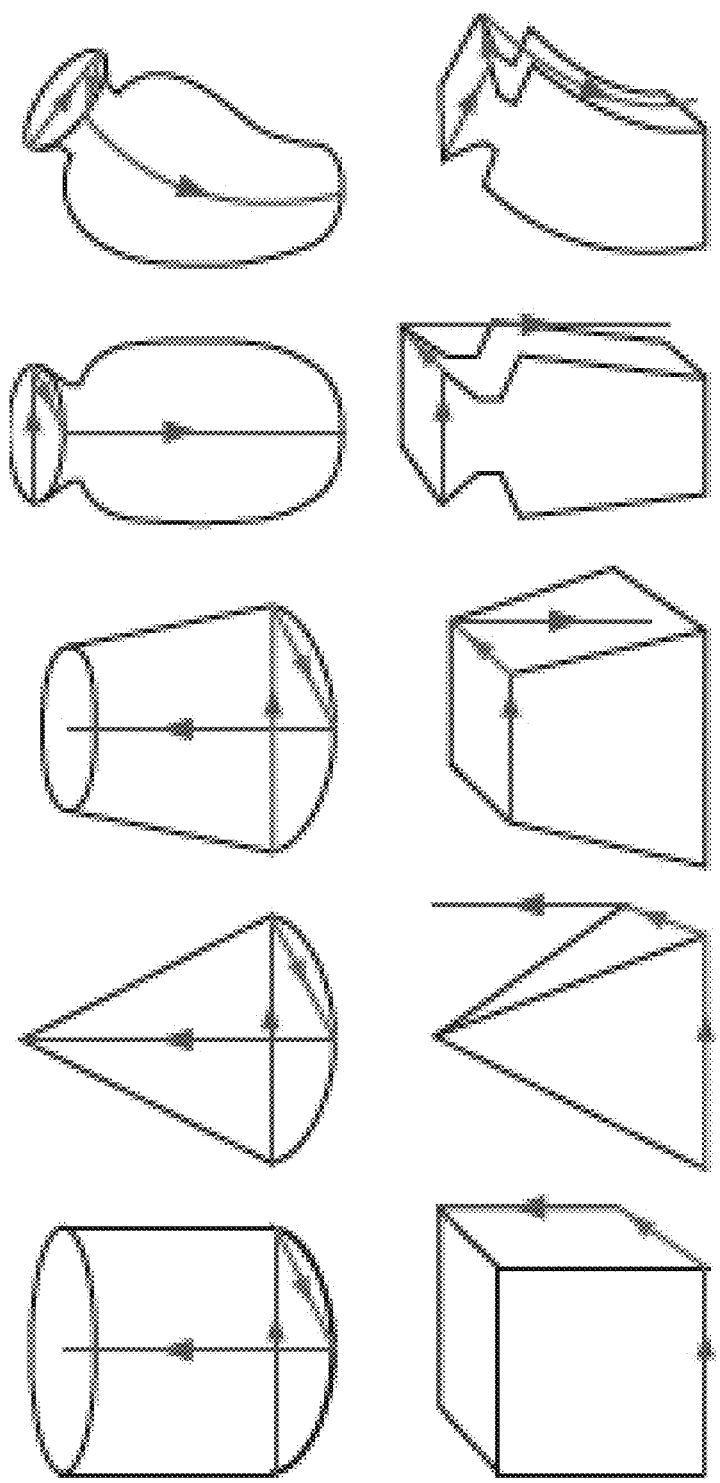
Figure 6:
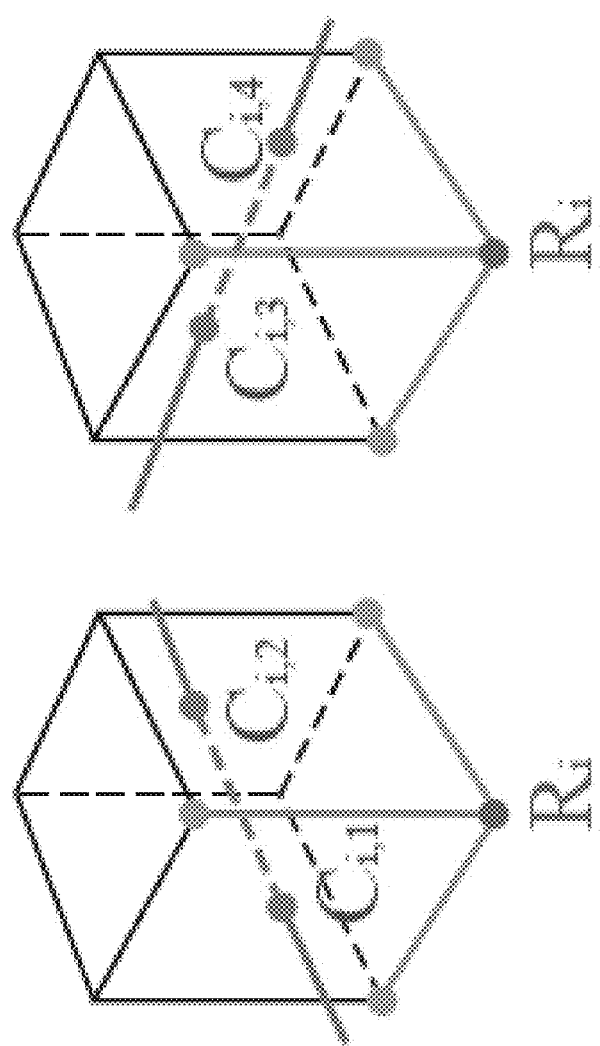
Figure 11:
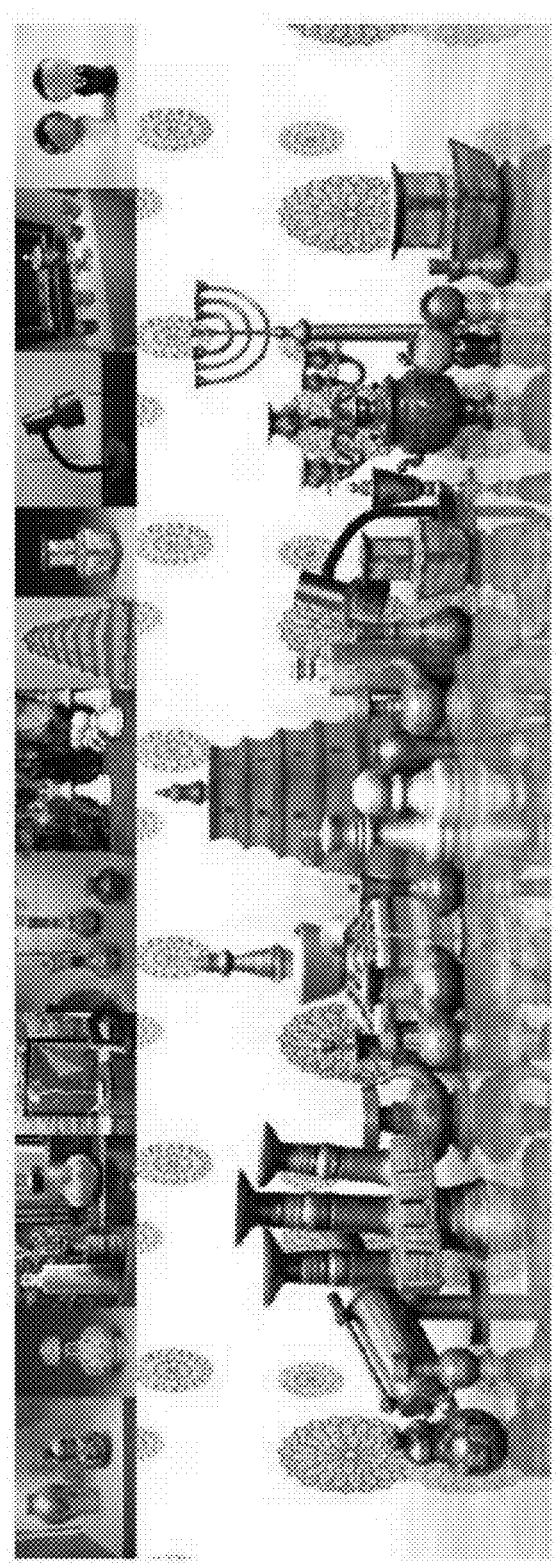
Figure 12:
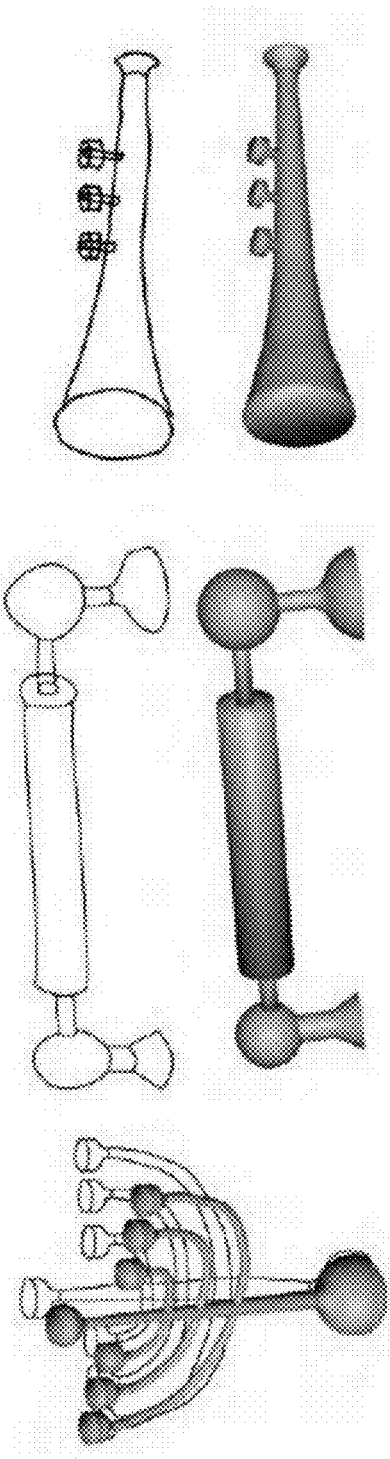

FIGS. 2A-2F schematically illustrate the various stages of extracting the object, modeling, and reinserting a rotated version of the image back into the original photograph, according to embodiments of the present invention;

FIGS. 3A-3E are simplified diagrams illustrating drawing a two-dimensional profile of a primitive and sweeping the profile over a curved axis of the primitive, the profile snapping to the successively shrinking edges of the primitive, according to embodiments of the present invention;

FIG. 4 is a simplified diagram illustrating a series of graphic primitives and their representation as a series of three sweeps respectively, according to embodiments of the present invention;

FIGS. 5A-5B are simplified diagrams illustrating alignment of different primitives based on axis points, according to embodiments of the present invention;

FIG. 6 is a simplified diagram illustrating the use of sweeps for representation of cubes according to embodiments of the present invention;

FIGS. 7A-7E are a series of photographs in a top row, from which objects are extracted, modeled and manipulated in a second row and then replaced in the original photograph in the third row according to embodiments of the present invention;

FIGS. 8A-8D illustrate how parts can be taken from different images to deal with lack of detail or occlusion of parts in one or other of the images according to embodiments of the present invention;

FIG. 9 shows four series of three images, in each of which a detail from an original object is replicated according to embodiments of the present invention;

FIG. 10 shows two series of photographs in which an object in the leftmost image in each series is modified in different ways according to embodiments of the present invention;

FIG. 11 is a collage made up of objects from individual photographs, the collage generated according to embodiments of the present invention; and FIG. 12 is a simplified diagram showing the generation of 3D models according to embodiments of the present invention from originating sketches.

DESCRIPTION OF SPECIFIC EMBODIMENTS OF THE INVENTION

The present invention, in some embodiments thereof, relates to three-dimensional modeling based on a single photograph.

The present embodiments may provide an interactive technique for modeling 3D objects having a clear geometry, typically but not exclusively man-made objects, by extracting them from a single photograph. The modeling of a 3D shape from a single photograph requires the understanding of the components of the shape, their projections, and relations. These are particularly difficult for automatic algorithms but are simple cognitive tasks for humans. The present interactive method may intelligently combine the cognitive ability of humans with the computational accuracy of the machine. To extract an object from a given photograph, the user draws cross-sectional profiles of parts of the object and sweeps the profile over the part using simple gestures, to progressively define a 3D body that snaps to the shape outline in the photo. The generated part adheres to various geo-semantic constraints imposed by the global 3D structure. As explained below, with the present intelligent interactive modeling tool, the daunting task of object extraction is made simple. Once the 3D object is extracted, it can be quickly edited and placed back into photos or 3D scenes, offering object-driven photo editing tasks which are impossible to achieve in image-space.

More particularly, the present disclosure teaches an interactive technique to model 3D man-made objects from a single photograph utilizing the interplay between humans and computers, while leveraging the strengths of both. The human is involved in perceptual tasks such as recognition, positioning, and partitioning, while the computer performs tasks which are computationally intensive or require accuracy. Guided by the present method, the final model of the object includes its geometry and structure, as well as some of its semantics. This allows the extracted model to be readily available for intelligent editing, while maintaining the shape's semantics.

The present approach is based on the observation that many man-made objects can be decomposed into simpler parts that can be represented by a generalized cylinder or similar primitives. An idea of the present method is to provide the user with an interactive tool to guide the creation of 3D editable primitives. The tool is based on a relatively simple modeling gesture referred to herein as sweep-snap. The sweep-snap gesture allows the user to explicitly define the three dimensions of the primitive using three sweeps. The first two sweeps define the first and second dimension of a 2D profile and the third, longer, sweep is used to define the main curved axis of the primitive.

While the user sweeps the primitive, the computer program dynamically adjusts the progressive profile by sensing the pictorial context on the photograph and automatically snapping to it. With such sweep-snap operations the user models 3D parts that adhere to the object in the photographs, while the computer automatically maintains global constraints with other primitives composing the object. The present embodiments use geo-semantic constraints that define the semantic and geometric relations between the primitive parts of the final 3D model such as parallelism and collinearity.

The present method thus disambiguates the three dimensional problem by an explicit sweep move of a 2D entity. The present embodiments adopt a geo-semantic constraint inference to assist the modeling of man-made objects. Thanks to the presently disclosed user interaction, the present embodiments may be able to achieve faster modeling than the prior art systems listed above and can support fuzzy and noisy image edges as well as clear sketches and photographs. The present embodiments obviate any requirement for sketch classification and avoid the annoyance of false-positives when geo-semantic optimization falls into a local minimum.

As mentioned above, Zheng et al. [36] proposed using cuboid proxies for semantic image editing. Man-made objects are modeled by a set of cuboid proxies, possibly together with some geometric relations or constraints, allowing their manipulation in the photo. The method of the present embodiments achieves similar image manipulations with a larger variety and more complex man-made models with more kinds of geo-semantic constraints. The present embodiments may also recover a full 3D model of the object rather than just a proxy, and support various shapes rather than just cuboids. Using the user interaction the present embodiments avoid the need for unreliable image segmentation and unsupervised model fitting. In the present embodiments, the user may provide vital information in the modeling process with little effort.

Using sweep-snap technology, non-professionals can extract various 3D objects from photographs. These objects may then be used to build a 3D scene or to alter the image itself by manipulating or editing the objects or its parts in 3D, and pasting them back into the photograph. The present disclosure contains results of a variety of such examples.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1A:
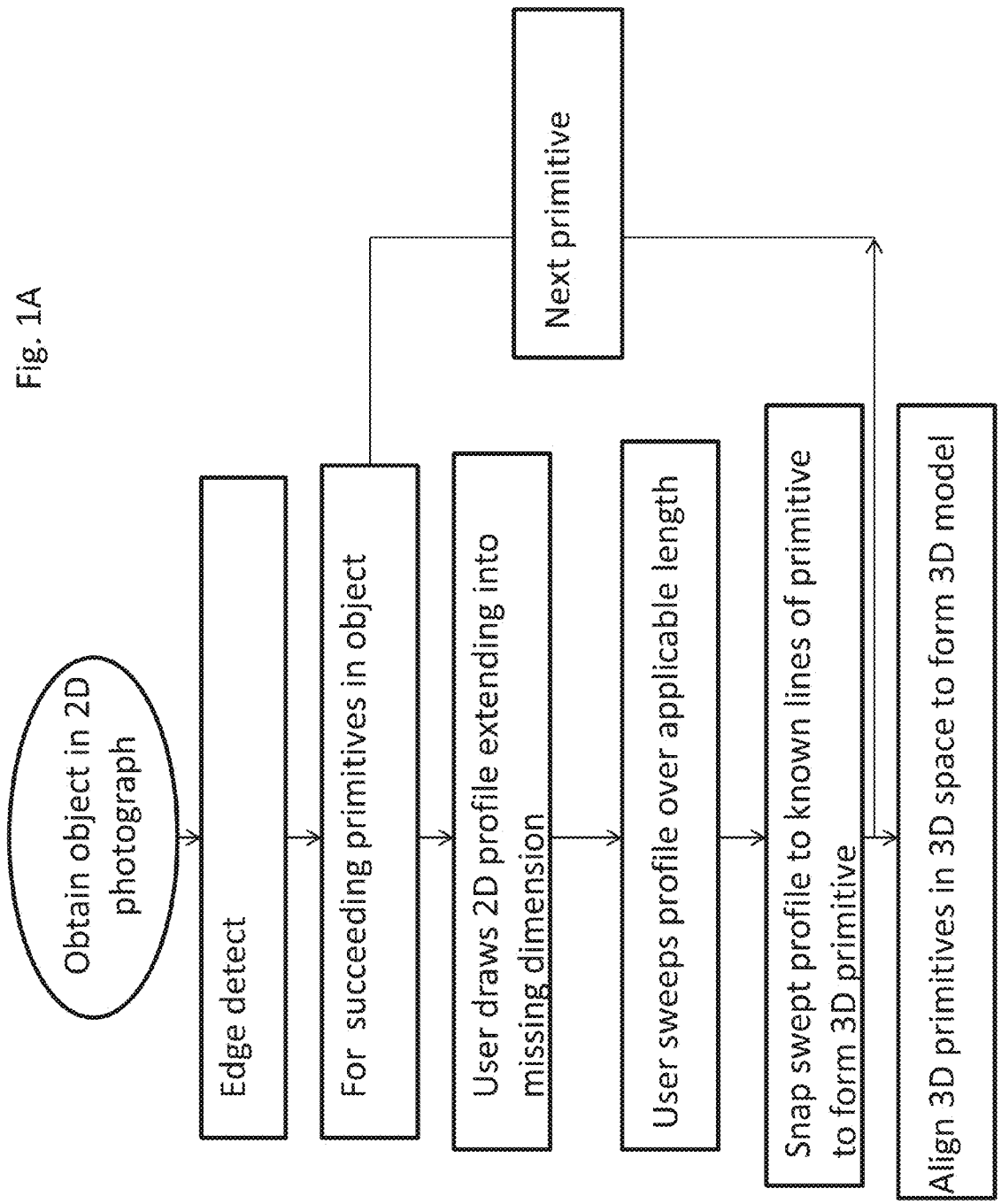

Referring now to the drawings, FIG. 1A is a simplified diagram illustrating a method of extracting a three-dimensional model from a single two-dimensional photograph according to a first embodiment of the present invention.

The object in the photograph is typically made up of several geometric parts, and needs to be extracted from the single two-dimensional photograph. Edge detection may be used to determine the bounds of the object from the photograph. A typical object is that shown in FIG. 1B. Edge detection may thus define a two-dimensional outline of said artificial object within the photograph. The method then provides the user with an interface and interactively allows the user to define two-dimensional profiles of successive ones of said geometric parts. The profile may be drawn by the user or obtained from a library and its extent defined by sweep motions, the two short sweeps mentioned herein. The interface then interactively allows the user to sweep the profiles over the relevant geometric part within the image. This is the long sweep, which shows the computer where the 2D profile goes. The sweep is snapped to the appropriate 2D outline.

The method then generates three-dimensional model parts from existing detected edges of the corresponding geometric parts and the sweeping of the respective profile. The method then aligns the three-dimensional model parts in 3D space to form a consistent three-dimensional model. This alignment is a further snap stage.

FIG. 1B illustrates a man-made object of some complexity, but which is in fact made up of easily identifiable parts of fairly simple geometry, to which the procedure of FIG. 1A may be applied. Thus most machine-based programs would be hard pressed to identify a single object and would certainly have difficulty working out how the object extends in the third dimension, but a human would readily recognize an object of circular cross-section having a central stem, six branches and a hexagonal base, and each branch and the central stem having cups at the upper end which are aligned. The object is shown from two different angles.

Figure 2:
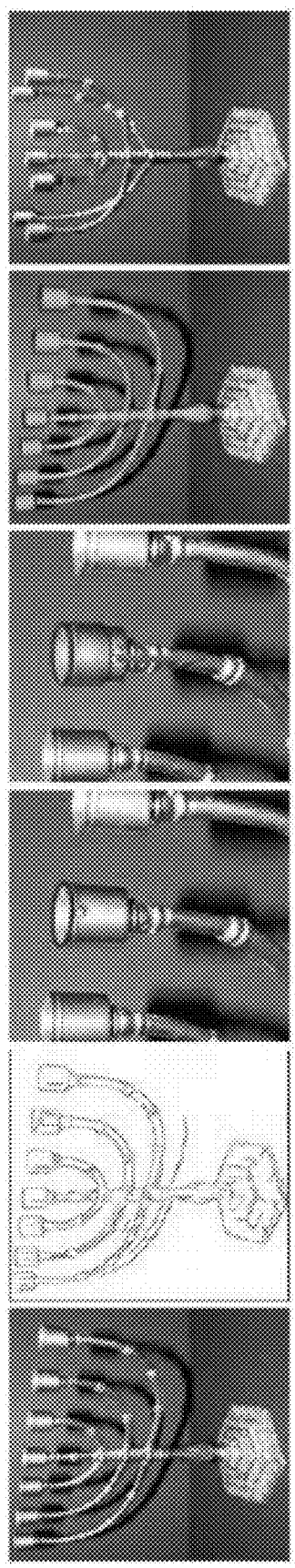

Reference is now made to FIG. 2, which is an overview of how the sweep-snap technique of FIG. 1A may be applied to the object of FIG. 1B. FIG. 2(a) shows the input image with the object of interest. FIG. 2(b) shows extracted edges of the input object. Note that as well as the actual lines of the object the edge extractor has in fact picked up a line that belongs to the object's shadow.

FIG. 2(c) illustrates drawing a 2D profile of a primitive, a geometric part of the object having a constant or smoothly changing cross-section. FIG. 2(d) shows sweep-snapping to the 3D model of the primitive. FIG. 2(e) illustrates application of a geo-semantic constraint to achieve the final model of the object, as will be discussed in greater detail below. FIG. 2(f) illustrates what can be done subsequently with the 3D model. In this case the object has been edited by rotating each arm in a different direction.

In more detail, the interactive modeling process takes as input a single photo such as shown in FIG. 2(a). The goal is to generate a 3D model whose projection exactly matches the object in the image. Using a sweep-snap modeling technique the user constructs the whole object in parts. Implicitly, the user decomposes the object into simple parts, which are often semantic. Such decomposition is both easy and intuitive for users, but provides significant information for reconstructing a coherent 3D man-made object from its projection. The parts are expected to have typical geometric relations that can be exploited to guide the composition of the whole object.

Although the user interacts with the given photo, the actual modeling algorithm uses an outline image of the object as shown in FIG. 2(b). This image is created by edge detection and merging of continuous sequences of edge points to curves, as illustrated by the different colors in the figure.

To create one part, the user interactively fits a 3D primitive into the given photo. This operation is not trivial since the photo lacks the third dimension and fitting can be ambiguous. The challenge is to provide the interactive means to disambiguate such fitting. The sweep-snap technique of the present embodiments requires the user to generate a 3D model that roughly approximates the target part, and snaps to the extracted outline of the object.

The user thus defines the 3D approximate part by first drawing a 2D profile of the part and then its main axis. The former is done by drawing a 3D rectangle or circle directly over the image, while the latter is done by sweeping the profile along a straight or curved axis to form the 3D part. Defining the profile as well as the sweeping operation are simple tasks since they do not demand accuracy. The profile dimensions are guided by the object's left and right outlines as shown in FIG. 2(c). While sweeping, the 3D body of the part is also defined by snapping to these outlines. Thus, the part can be sketched quickly and casually by the user. FIG. 2(d) shows the result of sweeping the profile from (c) along one of the tubes of the object, in this case a menorah-style candelabrum. The sweep-snap operation is discussed in greater detail below. To compensate for perspective distortion, during this process the field of view angle of the camera taking the scene is estimated.

As the modeled parts are being gathered, the geometric relations among them serve (i) to assist in disambiguating and defining the depth dimension and (ii) to optimize the positioning of the parts. These geometric relations include parallel, orthogonal, collinear and coplanar parts. Most of these are automatically inferred from the positioning of the parts, but the user can also specify the constraints for the selected parts manually. The present embodiments optimize these geo-semantic constraints while taking into account the snapping of the 3D geometry to the object's outlines and the user's sweeping input. The complete model with geo-semantic relation is shown in FIG. 2(e). The geo-semantic relations not only help define the 3D model, but once computed, they remain encoded as part of the 3D representation. Such representation supports smart (semantic) editing of the 3D model, as demonstrated in FIG. 2(f) and other figures herein.

Single Primitive Fitting

The main challenge in image-guided modeling of a 3D part, is to disambiguate the observed subject and infer the missing depth dimension. Directly fitting a 3D object into the image requires many geometric hints to constrain the non-linear optimization problem [27]. The present embodiments explicitly guide the 3D inference with simple user interaction. The sweep-snap modeling tool consists of two stages. In the first, the user draws a 2D profile assisting by explicitly defining its position in 3D. In the second, the user sweeps the profile to implicitly define a volumetric part.

Sweep-snap relies on snapping of primitives to object outlines created from image edges. To extract the image edges and build candidate object outlines the present embodiments adopt a method for hierarchical edge feature extraction based on spectral clustering [2]. Then, a technique is applied to link the detected edge pixels into continuous point sequences [6], each shown in different color in FIG. 2(b) and FIG. 3(a). To each detected edge pixel, the process associates an edge orientation computed in its 5×5 neighborhood. In the following, we first describe the sweep-snap technique for generalized cylinders and then briefly show how it extends to the simpler case of the generalized cuboid.

Reference is now made to FIGS. 3a-3e, which illustrate the sweep snap process of the present embodiments on an exemplary curved cone primitive. The modeling process of a primitive comprises defining a 2D profile and sweeping the profile along the primitive using the main axis of the primitive.

Figure 3:
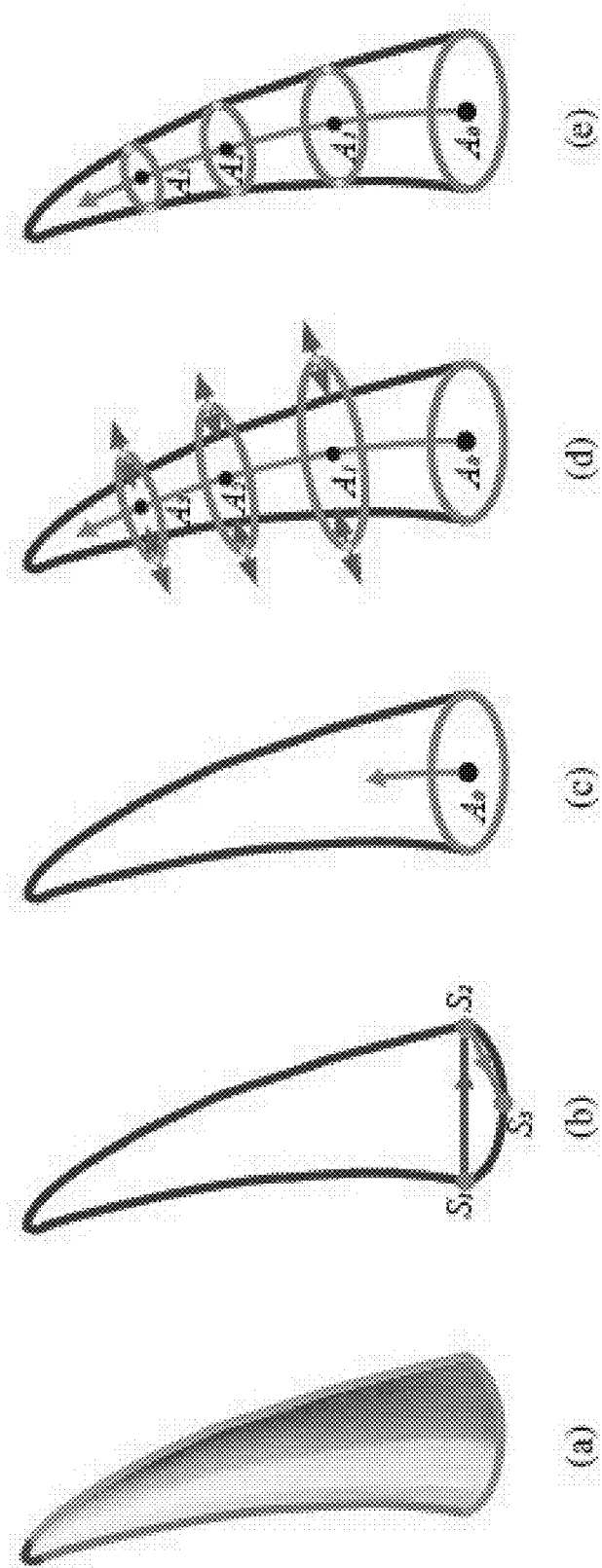

Profile. In a first stage, the user draws the 2D profile of the generalized cylinder, usually at one end of the shape. This is illustrated in FIG. 3, where (a) is the input image with detected outlines. The task is to draw a 2D profile correctly oriented in 3D. This can be regarded as positioning a disk in 3D by drawing its projection in 2D. To simplify this task, we assume that the disk is a circle, thus reducing the number of unknown parameters. Later, the circular disk can be warped into an elliptical one based on the 3D reconstruction. The drawing of a circular disk is accomplished by drawing two straight lines over the image, see FIG. 3(b). The first line defines the major diameter of the disk, and then the second line is dragged to the end of the minor diameter. This forms an ellipse in image space that matches the projection of a circular disk, see FIG. 3(c). The depth value of the disk is set to 0. The normal direction and radius of the disk are assigned according to the length and orientation of the two diameters of the elliptical projection.

Sweeping. Once the base profile is ready, in the second stage, the user sweeps it along a curve that approximates the main axis of the 3D part. In general, this curve should be perpendicular to the profile of the 3D primitive, as indicted by blue arrows in FIG. 3 (c). As the curve is drawn, copies of the profile are placed along the curve, and each of them is snapped to the object's outline.

During drawing, the axis curve is sampled in image space at uniform intervals of five pixels producing sample points $A_0, \ldots A_N$. Then, at each sampled point $A_i$, a copy of the profile is fit, centered around the curve. The normal of the profile is aligned with the orientation of the curve at $A_i$, and its diameter is adjusted to meet the object's outlines. Together, the adjusted copies of the profile form a discrete set of slices along the generalized cylinder, see FIG. 3(e).

At each point $A_i$, we first copy the profile from $A_{i-1}$ and translate it to $A_i$. Then we rotate it to accommodate for the bending of the curve. Now, we consider the two tips of the profile, denoted by $p_i^0, p_i^1$—indicated by yellow points in FIG. 3(d). For each contour point $p_i^j$, $j \in [0,1]$ we cast a 2D ray from point $A_i$ along the diameter of the profile, through $p_i^j$ seeking for an intersection with an image outline.

Finding the correct intersection of the ray with an image outline is somewhat challenging. The image may contain many edges in the vicinity of the new profile. The closest one is not necessarily the correct one, e.g. when hitting occlusion edges. In other cases, the correct edges may be missing altogether. To deal with these we first limit the search for an intersection to a fixed interval—the size of which is governed by limiting the diameter change of adjacent profiles not to exceed 20% of the length. Second, we search for an intersecting outline that is close to perpendicular to the ray. If the angle between the ray and the outline is larger than $\pi/3$ the candidate intersection is discarded.

When an intersection is found the contour point $p_i^j$ position is snapped to the intersection position. If both contour points of the profile are snapped, one may adjust the location of $A_i$ to lie in their midpoint. If only one side is successfully snapped, the length of the snapped side may be mirrored to the other side and the other contour point may be moved respectively. Lastly, if none of the two contour points is snapped, the size of the previous profile is maintained.

Reference is now made to FIG. 4, which shows a series of geometric primitives that may be included in embodiments of the present invention. The arrows indicate a three-stroke paradigm that can be used with each primitive to indicate translations of the basic primitive.

Numerous primitives can be used. Generalized cuboids are modeled in a similar manner as generalized cylinders. The main difference lies in the first stage of modeling the profile. The two strokes that define the profile of a cuboid follow the two edges of the cuboid base instead of the diameters of the disk, as shown in the bottom row of FIG. 4 by the red and green lines. Simpler primitives such as spheroids or simple cubes are also supported by direct modeling in the present embodiments.

The above modeling steps follow user gestures closely, especially when modeling the profile. This provides more intelligent understanding of the shape but is less accurate. Therefore, after modeling each primitive, we apply a post-snapping stage to better fit the primitive to the image as well as correct the view. We search for small transformations (±10% of primitive size) that create a better fit of the primitive's projection to the edge curves that were snapped in the editing process. We also automatically refine the field of view angles (initialized to 45 degree) after each modeling step for better fitting.

In many cases, the modeled object has some special properties, or priors, that can be used to constrain the modeling. For example, if we know that a given part has a straight spine, we can constrain the sweep to progress along a straight line. Similarly, we can constrain the sweep to preserve a constant or linearly changing profile radius. In this case, the detected radii are averaged or fitted to a line along the sweep. We can also constrain the profile to be a square or a circle. In fact, a single primitive can contain segments with different constraints: it can start with a straight axis and then bend, or use a constant radius only in a specific part. These constraints are extremely helpful when the edge detection results are bad. Lastly, we provide the possibility to interactively adjust the profile diameter locally, for instances, in places where the outlines were not salient or missing altogether.

To further ease the modeling interaction, the present embodiments may also provide a copy and paste tool. The user can drag a selected part that is already snapped over to a new location in the image and snap it again in the new position. While copying, the user can rotate, scale, or flip the part.

Inter-Part Optimization

The technique described above generates parts that fit the object outlines. The positions of these parts in 3D are still ambiguous and inaccurate. However, as these parts are components of a coherent man-made object, they have certain geometric relations among them derived from the semantics of the object. Constraining the shape based on such geo-semantic inter-parts relations allows modeling coherent shapes [9, 35, 21, 27].

A direct global optimization of the positioning of parts that considers their geo-semantic relations is computationally intensive and subject to fall into local minima, since each component has many degrees of freedom. In the present setting, however, the modeled components are also constrained to agree with some outlines of the image. This can significantly reduce the degrees of freedom of the parts. By considering the image constraints, the dimensionality of the optimization space can be lowered and local minima are avoided. In the following, we describe how we simplify the general problem and solve a rather light-scale optimization to respect the geo-semantic constraint among the sweep-snapped parts.

The key idea is that by fixing the projection of a part, its position and orientation can be determined by one or two depth values only. We first describe the method for simple parts that can be modeled by a single parameter, namely parts which were modeled along a straight axis. General cylinders and cuboids with curved axes will later be approximated by two arbitrary-connected straight axis primitives at the start and end of the shape.

Figure 5:
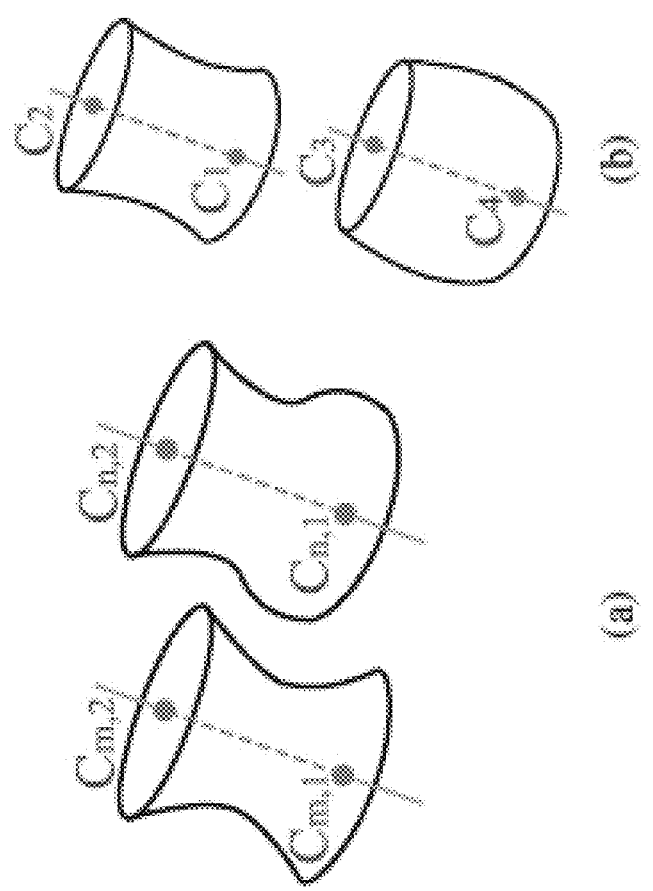

Reference is made to FIG. 5, which is a simplified diagram showing an example for inferring geo-semantic constraints, based on (a) Parallelism and (b) Collinear axis endpoints. FIG. 5 illustrates concave cylinders. In FIG. 5a the two cylinders have parallel axes. In FIG. 5b the cylinders also have parallel axes but are not aligned next to each other.

The position and orientation of a straight-axis generalized cylinder i, can be determined by two points we call anchors, $C_{i,1}$ and $C_{i,2}$ along its main axis, as shown for example in FIG. 5. Referring now to FIG. 6, in a similar way, a cuboid part can be represented by six anchors $C_{i,j}$, $j \in [1,6]$ positioned at the center of each face. Every opposite pair of anchors defines one main axis of the cuboid. Even though four anchors are enough to fix the position and orientation of a cuboid, an embodiment uses six anchors to allow setting various geo-semantic constraints on this part.

As the user defines the 3D part i using three strokes for the three dimensions, as discussed above in respect of FIG. 1A, we can utilize the strokes, or sweeps, to define a 3D local orthogonal coordinate system for the part. First, we define the origin of the coordinate system at a reference point $R_i$ on the part's projection. For a cuboid part we pick the point connecting the first and second of the user's strokes and for a cylinder we pick the point connecting the second and third strokes. Due to the internal orthogonality of the straight part, the profile of the part is perpendicular to the main axis. Therefore, we may use the endpoints of the user's strokes (after snapping them to the image) to define three points that together with $R_i$ create an orthogonal system. These are the orange points and lines in FIG. 6. Note that this coordinate system is defined in camera coordinates. The x and y values of the end points are determined by the projection and their depth values can be found as a function of $z_i$, the z value of $R_i$, by using three orthogonality constraints equations.

Next, the positions of the anchor points $C_{i,j}$ in world coordinates can be defined using the orthogonal local axes. This defines the structure of part i. Since the local axes depend only on the depth value $z_i$ of the point $R_i$, we can parameterize the positions of $C_{i,j}$ as a function of $z_i$: $C_{i,j}=F_{i,j}(z_i)$. That is, the position and orientation of the whole part become a function of a single unknown $z_i$. $F_{i,j}$ has the form $$F_{i,j}(z_i) = \frac{b}{a(z_i + v)}$$

for each coordinate component, where a depends only on the x and y-coordinate of the endpoints of the local axes, and b, v are decided by perspective parameters. They are different for each axis endpoint and for each coordinate component.

We may use the anchor points to define the geo-semantic relations among the parts. Specifically, we support six types of constraints: parallelism, orthogonality, collinear axis endpoints, overlapping axis endpoints, coplanar axis endpoints and coplanar axes. During the modeling phase, for each type, we test whether a pair of components is close to satisfying one of the above geo-semantic constraints, and if so, we add the constraint to our system. For example, for two cylinders with index m and n, if the angle between vector $(C_{m,1}-C_{m,2})$ and $(C_{n,1}-C_{n,2})$ is smaller than 15 degree, we may add a parallel constraint $(C_{m,1}-C_{m,2})\times(C_{n,1}-C_{n,2})=0$ to our system of constraints. Similarly if any three among the four anchors of two cylinders form a triangle containing an angle larger than 170 degree, then we add a collinear axes constraints: $(C_1-C_2)\times(C_1-C_3)=0$ as shown in FIG. 5. Internal constraints such as orthogonality and concentricity of a cuboid axes are also added to the system. Finally, the present modeling tool provides ways to manually enforce or revoke a constraint for selected primitive parts.

FIG. 6 thus illustrates two cubes and shows how the present embodiments determine the coordinates $C_{i,j}$ for the axis endpoints of a cuboid from the depth value $z_i$ of the reference point $R_i$.

Suppose we have defined p geo-semantic constraints $G_k$ for a set of n components, together with the objective function of fitting to the image outline, we define the following optimization system:

$$\text{minimize } E = \sum_{i=1}^{n} w_i \left( \sum_{j=1}^{m_i} \|C_{i,j} - F_{i,j}(z_i)\|^2 \right) \quad (1)$$

$$\text{subject to } G_k(C_{1,1}, \ldots, C_{n,m_n}), k = 1, \ldots, p, \quad (2)$$

where $m_i$ is the number of axes of ith primitive part. We add weights $w_i$ proportional to the radius of the base profile of each part and the length of its axis. Larger parts have more impact on the solution since typically larger parts are modeled more accurately. Intuitively, the first equation tries to fit the part's geometry $(C_{i,j})$ to the image outline and the user's gestures, while the second set of equation define the geo-semantic constraints.

Solving for $C_{i,j}$ and $z_i$ together we have a non-linear non-convex optimization problem with non-linear constraints. Such a system is very hard to solve directly without being trapped in local minima. Hence, we decompose the solution of this system into a two-step procedure. The first step tries to find a good initial position for all parts together by changing only their depth (governed by $z_i$) to adhere to the geo-semantic constraints. In the second step, the full system is solved—allowing the shape of the parts $(C_{i,j})$ to change as well.

In the first step, we modify the soft constraint in Equation (1) to a hard one, and replace $C_{i,j}$ by $F_{i,j}(z_i)$ in all equations. This means Equation (1) is trivially true and we are left with just the constraints in Equation (2). In effect, this means we fix the projection and find the optimal $z_i$ fitting the geo-semantic constraints. This reduces the number of variables to n ($z_i$, $1\leq i\leq n$) and changes Equation (2) into an over-determined system, where each equation only contains two different variables. We find the least squares solution $\bar{z}_i$ for example by conjugate gradient, with all $z_i$ values initialized to 0.

This first step provides a good initial condition to find the optimal solution for $C_{i,j}$, as it should be around the values $F_{i,j}(\bar{z}_i)$, fixing only small inconsistencies with the geo-semantic constraints. Hence, in the second step, we solve the full optimization of Equation (1) with the set of constraints in Equation (2), for example using an augmented Lagrangian method. Both steps are fast, and we are able to avoid local minima due to better initialization from the first step. This leads to an interactive rate optimization. Note that the nonlinearity of $F_{i,j}(\ )$ is due to the assumption of a perspective projection. However, we can approximate this projection linearly since we assume the change in $z_i$ is small. This further increases the speed and stability of our solution.

Lastly, to handle parts with a non-straight axis, we first simplify the problem by assuming that the general axis lies on a plane. Second, we treat the part as being a blend of two straight-axis sub-parts, placed at the two ends of the part. The position of each of these sub-parts is determined by a single depth value in the optimization above, and the whole part is defined by connecting the two subparts with a general axis while constraining the profile snapping.

The Derivation of F

For a straight primitive with reference point R, We denote the three orange points in FIG. 6 by $P_m$, $m\in[1,3]$, the order doesn't matter. Then we have three equation defined by orthogonality in world coordinates: $\overrightarrow{RP_m}\cdot\overrightarrow{RP_n}=0$, where the pair $(m,n)\in P=\{(1,2),(2,3),(3,1)\}$. We denote the world coordinates of $P_m$ by $(X_m, Y_m, Z_m)$, screen coordinates by $(x_m, y_m)$, and depth by $z_m$. For R, they are $(X_r, Y_r, Z_r)$ etc. So we can write the equations:

$$(X_m-X_r)(X_n-X_r)+(Y_m-Y_r)(Y_n-Y_r)+(Z_m-Z_r)(Z_n-Z_r)=0,$$

by inverse perspective transformation, we can change this to:

$$\left(\frac{Nx_m}{z_m+v} - \frac{Nx_r}{z_r+v}\right)\left(\frac{Nx_n}{z_n+v} - \frac{Nx_r}{z_r+v}\right) + \left(\frac{Ny_m}{z_m+v} - \frac{Ny_r}{z_r+v}\right)\left(\frac{Ny_n}{z_n+v} - \frac{Ny_r}{z_r+v}\right) +$$
$$\left(\frac{u}{z_m+v} - \frac{u}{z_r+v}\right)\left(\frac{u}{z_n+v} - \frac{u}{z_r+v}\right) = 0,$$

where N,u,v are constant when the perspective parameters are fixed. Since the projection is fixed, $x_m$, $y_m$, $x_n$, $y_n$ are all fixed. The only variables are zs. To solve these equations, we first replace all zs by $\bar{z}=z+v$, By multiplying $\bar{z}_m\bar{z}_n\bar{z}_r^2$ on both side, and representing $\bar{z}_m$ by $\bar{z}_n$, we get:

$$\bar{z}_m = \frac{(x_m x_n + y_m y_n + c^2)\bar{z}_r^2 - (x_m x_r + y_m y_r + c^2)\bar{z}_r \bar{z}_n}{(x_n x_r + y_n y_r + c^2)\bar{z}_r - (x_r^2 + y_r^2 + c^2)\bar{z}_n},$$

where $c=v/N$. In this representation we replace the two unknown $\bar{z}$ by the third, and solve for the third $\bar{z}$ as a function of $\bar{z}_r$. Let $C_{s,t}=(x_s x_t + y_s y_t + c^2)$, where (s,t) can be 1, 2, 3 and r, we directly give the representation of $\bar{z}_m$:

$$\bar{z}_m = \pm \frac{C_{r,m}^2 C_{n,l} - C_{r,l} C_{r_m} C_{n,m} - C_{r,n} C_{r_m} C_{l,m} + C_{r,r} C_{l,m} C_{n,m}}{C_{r,r}^2 C_{l,n} - C_{r,r} C_{r,l} C_{r,n}} \bar{z}_r.$$

Due to symmetry, m, n, l can be any permutation of 1, 2, 3. Note that the two solutions exactly match the ambiguity of perspective projection of the primitive. We examine the two solutions and use the one that can generate a projection that fits the image edges better. This has the form of $\tilde{z}_m = a\bar{z}_r$, which means $z_m$ is linear with $z_r$. We can easily compute the world coordinates $(X_m, Y_m, Z_m)$ as a function of $z_r$ by inverse perspective transformation. Since the axis endpoints $C_{i,j}$ are linear combination of $P_m$, we can also decide each of their coordinates as a function of $z_r$ in the form of $$\frac{b}{a(z_r+v)},$$

where b, v are decided by the perspective, and a is decided by the above derivation.

Experimental Results

The sweep-snap interactive technique referred to herein is currently implemented in C++. The system provides an outline view for sweep-snap, a solid model view and a texture view for checking the model and image editing. The user can choose between "cuboid", "cylinder" or "sphere" primitives using a button or key shortcut. The system also provides conventional menu selection, view control and deformation tools. Most of the examples given below were modeled in a few minutes or less. The modeling process is intuitive and fluent so that even an untrained user with little experience of the technique can handle. Editing and repositioning the object requires activities which would be familiar to users of other parametric editing techniques.

Figure 7:
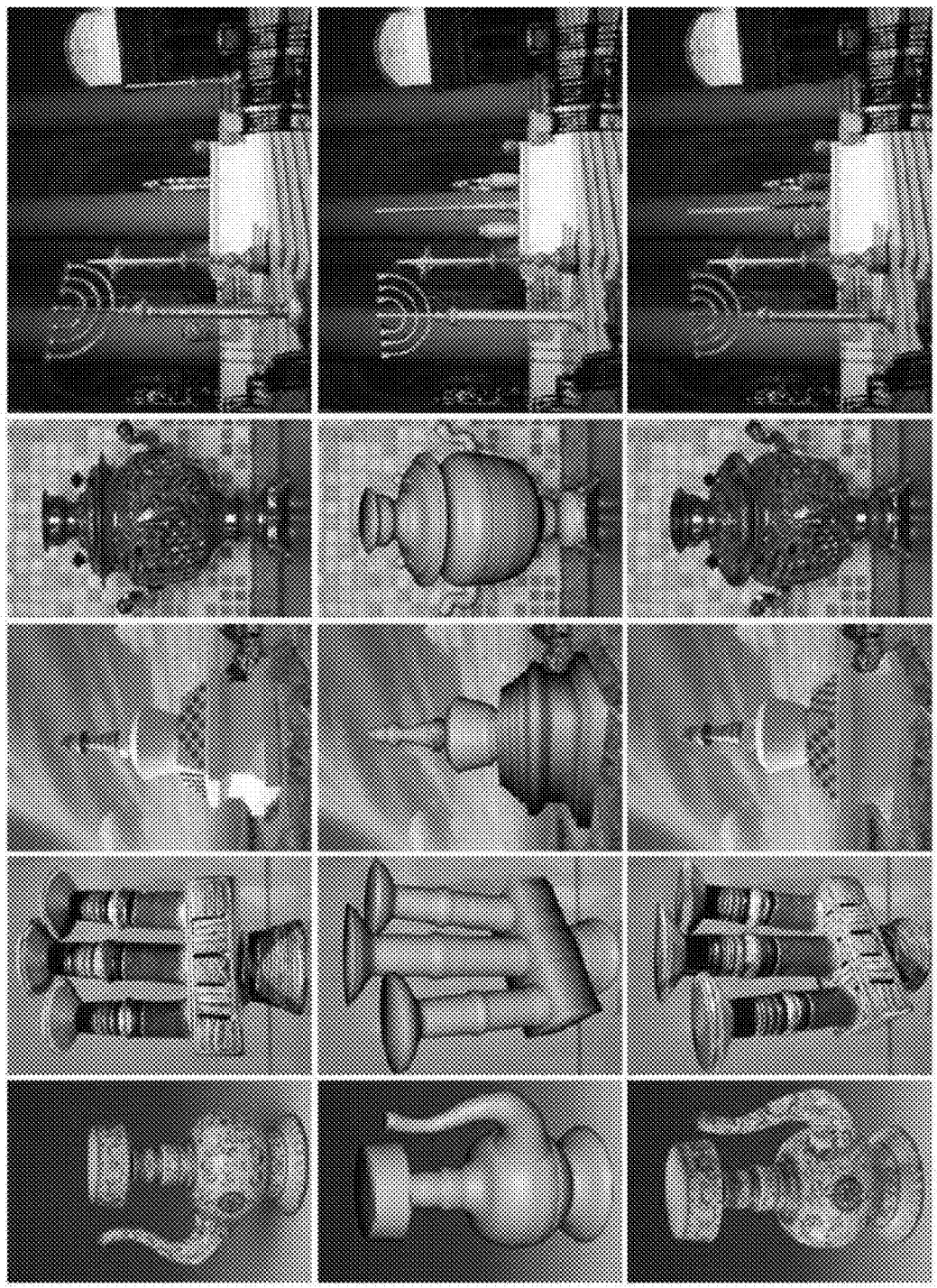

Once the objects have been modeled, the user may map the texture from the image onto the object, as exemplified in the bottom row in FIG. 7. By projecting a vertex of the mesh to the image plane, one can obtain the 2D coordinates of the vertex on the image. These are used as texture coordinates. Alpha matting on the foreground image is computed and mapped as a texture onto the model to eliminate the effect of background pixels. As there is no information regarding the back of the object, we simply use a symmetry assumption and minor the front texture content to the back. At each of the profile layers of the model, one can assign the same texture coordinate for the two vertexes which are mirrored symmetrically about the center of the layer. Note that on the two sides of the object, there may be centro-symmetric pairs that both face away from the camera. To deal with this situation, one may treat the texture associated with these vertexes as holes, and fill them with an image completion technique [3] from the texture.

Modeling from Single Image and Editing. The approximated 3D model and its texture allow semantic image editing. Before editing, the image of the 3D model is cut out from the photo, leaving a black hole (as demonstrated in FIG. 1) which is filled again using an image completion technique [3].

FIG. 2(f), referred to above demonstrates a menorah-style candelabrum where each arm is rotated by a different angle. All the candleholders have the same size, but due to the oblique view they appear at a different size in the photo. During modeling, to ensure this effect, one copies each candleholder and fits each one to the image, while requiring that they lie on the same plane and that their 3D sizes be the same. This efficiently recovers the true 3D position and shape of each part.

Reference is now made to FIG. 7. A series of man-made objects are shown in photographs in the top row. The second row shows the objects of the first row having been modeled according to the present embodiments and rotated or otherwise repositioned. The bottom row shows the objects reinserted into the original photograph following the rotation or repositioning of the second row.

Thus, in the middle row we show the extracted 3D models, repositioned and, in the third row, inserted back into the photo. The rightmost column shows the modeling and repositioning of three objects in one complex photo. Note that the Menorah has been rotated as well as translated on the ground plane.

Figure 8:
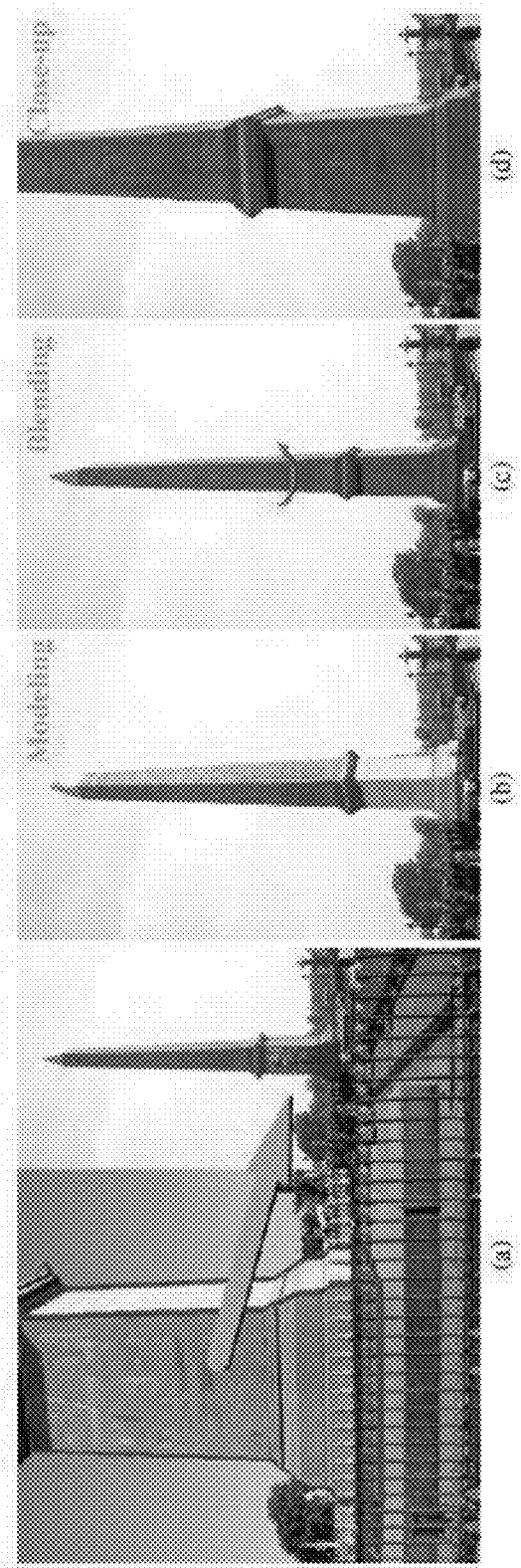

Reference is now made to FIG. 8, which shows how, even though the present embodiments require only one photograph, nevertheless a model or part of a model can be extracted from one photograph and subsequently inserted into another photograph or integrated into model parts extracted from the other photograph. Modeling the Obelisk in Paris from two photos as per the above involves (a) Taking the base of the Obelisk from a close view and thus capturing detail. (b) Transporting the partial 3D model from the close view to a more distant view, where part of the base is occluded, to complete the modeling. (c) the texture of the transported part is blended into the region it occupied and the whole is rotated. (d) The end result is that details of the base are visible in a close-up view of the model of the Obelisk, when in fact most of the obelisk is taken from the distant photograph.

More particularly, in FIG. 8 we show a case where two input photos are used to model one object: the Obelisk in Paris. First, the base of the Obelisk is modeled from a close up view in (a), where more details can be captured. Then, the partial 3D model is transported to another photo where the entire Obelisk is visible, but the base is occluded. Similar to a copy and paste procedure, the user positions the extracted base-part inside the image, and the part snaps to the image contours in (b). The user can then continue the modeling process. The texture of the transported part is blended to the color of the region it occupies to maintain consistency, as shown in the rotated view (c). The details of the base are still visible in the close up view (d) of the model of the Obelisk.

Reference is now made to FIG. 9, which shows three sets of three images. In each set the first image is the original photograph. In the second image parts of the object shown in orange are added from the model, to represent original parts which have been replicated and rotated or deformed, and in the third image the change is integrated into the original object. Thus in the first set of images, the tap gains two extra handles. The street light gains two extra lamps. The candelabrum gains two extra holders, and the samovar gains extra handles and knobs.

Thus, FIG. 9 shows four examples of modeling and editing. These examples show part-level editing, where some parts of the objects (highlighted in golden colors) are replicated and copied, possibly rotated to enhance and enrich the shape. The top left shows modeling a tap, changing its rotary switch to cruciform and rotating it. Then, the whole tap is copied and attached to another side of the wall. The bottom left shows a candleholder being modeled and rotated, with its two arms duplicated to a perpendicular position. We also enlarge the middle holder. The top right shows a street lamp with duplicated lamps moved to a lower position, rotated and copied to other positions in the street. The bottom right shows a samovar rotated with multiple copies of its handles pasted across its surface.

Reference is now made to FIG. 10, which shows a tea pot and a telescope and five different editing results of the original photograph. The leftmost images are the source, and the variations applied to the parts are non-linear variations.

FIG. 10 shows a variety of editing possibilities of two objects. Note the non-uniform scaling applied to the different parts.

In FIG. 11 we show a photograph with a collection of objects that were modeled and copied from other photos. The modeling and editing time of each example is discussed in Table 1, below, as well as the number of manually provided geo-semantic constraints. In general, an object in oblique view will need more manual constraints. Most of these constraints are coplanar axes, which are ambiguous to automatic inference.

Modeling from Sketch. Reference is now made to FIG. 12 which illustrates how the same model may emerge using sketches as input in place of photographs. Input sketches are taken from [27].

Recently, Shtuf et al. [27] presented a method to model objects from 2D sketches. In FIG. 11 we show examples of modeling several of the sketches they used. Since a sketch is typically inaccurate, in cases where the axis of the primitive differs too much from its modeling location, we ignore the boundary snapping in our geo-semantics optimization. Our modeling time (60 s on average) is significantly lower compared to the reported time of their technique (130 s on average).

from sketches. The modeled objects may be used to achieve semantic editing and composition of images, as well as creating simple 3D scenes by copying items from photographs. One may extend the types of supported primitives to allow modeling of free shapes of natural objects. It is also possible to add symmetry and smoothness constraints on the shapes. Sweep-snap can also be extended for modeling from multi-view image or video without the help of depth data. In terms of applications, we demonstrate editing and manipulation of geometry and furthermore, the recovered 3D model and surface norms can be used to achieve re-lighting and material editing.

It is expected that during the life of a patent maturing from this application many relevant pulse shaping and symbol decoding technologies will be developed and the scope of the corresponding terms in the present description are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many

TABLE 1

Modeling and editing times (in seconds) and the number of manually provided geo-semantic constraints (either adding or removing) for each example.

| Figure | 2 | 7 | | | | | 8 | 9 | | | | 10 | 11 | | |
|---|---|---|---|---|---|---|---|---|---|---|---|---|---|---|---|
| | | (a) | (b) | (c) | (d) | (e) | | | | | | | | | |
| Example | Menorah | (a) | (b) | (c) | (d) | (e) | Obelisk | tap | holder | lamp | samovar | Pot | telescope | trumpet | handle | horn |
| Time (s) | 80 + 25 | 15 | 20 | 35 | 30 | 65 + 35 | 20 | 30 + 25 | 45 + 35 | 40 + 50 | 50 + 20 | 15 + 30 | 100 + 30 | 80 | 30 | 60 |
| Constraints | 2 | 0 | 2 | 1 | 1 | 1 | 0 | 2 | 1 | 1 | 1 | 0 | 2 | 1 | 1 | 1 |

The photographs themselves usually have some distortions from ideal perspective projection, especially when an object is too close or taken from a wide angle camera. In this case, fisheye correction should be applied first before modeling.

CONCLUSION

We present an interactive technique to model 3D manmade objects from a single photograph by combining the cognitive ability of humans with the computational accuracy of the machine. The results show that the present embodiments may model a large variety of man-made objects from natural images or photographs, as well as modeling objects alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

[1] Angelidi, A., Canif, M., Wyvill, G., and King, S. 2004. Swirling-sweepers: Constant-volume modeling. In *Computer Graphics and Applications*, 2004. PG 2004. *Proceedings*. 12*th Pacific Conference on*, IEEE, 10-15.

[2] Arbelaez, P., Maire, M., Fowlkes, C., and Malik, J. 2011. Contour detection and hierarchical image segmentation. *Pattern Analysis and Machine Intelligence, IEEE Transactions on* 33, 5, 898-916.

[3] Barnes, C., Shechtman, E., Finkelstein, A., and Goldman, D. 2009. Patchmatch: a randomized correspondence algorithm for structural image editing. *ACM Transactions on Graphics-TOG* 28, 3,24.

[4] Barrett, W., and Cheney, A. 2002. Object-based image editing. In *ACM Transactions on Graphics* (TOG), vol. 21, ACM, 777-784.

[5] Cheng, M., Zhang, F., Mitra, N., Huang, X., and Hu, S. 2010. Repfinder: finding approximately repeated scene elements for image editing. *ACM Transactions on Graphics* (TOG) 29, 4, 83.

[6] Cheng, M. 2009. Curve structure extraction for cartoon images. In *Proceedings of The 5th Joint Conference on Harmonious Human Machine Environment*, 13-25.

[7] Choi, B., and Lee, C. 1990. Sweep surfaces modelling via coordinate transformation and blending. *Computer-Aided Design* 22, 2, 87-96.

[8] Eitz, M., Sorkine, O., and Alexa, M. 2007. Sketch based image deformation. In *Proceedings of Vision, Modeling and Visualization (VMV)*, 135-142.

[9] Gal, R., Sorkine, O., Mitra, N., and Cohen-Or, D. 2009. iwires: an analyze-and-edit approach to shape manipulation. In *ACM Transactions on Graphics* (TOG), vol. 28, ACM, 33.

[10] Gingold, Y., Igarashi, T., and Zorin, D. 2009. Structured annotations for 2d-to-3d modeling. In *ACM Transactions on Graphics* (TOG), vol. 28, ACM, 148.

[11] Goldberg, C., Chen, T., Zhang, F., Shamir, A., and Hu, S. 2012. Data-driven object manipulation in images. In *Computer Graphics Forum*, vol. 31, Wiley Online Library, 265-274.

[12] Hyun, D., Yoon, S., Chang, J., Seong, J., Kim, M., and Jüttler, B. 2005. Sweep-based human deformation. *The Visual Computer* 21, 8, 542-550.

[13] Igarashi, T., Kawachiya, S., Tanaka, H., and Matsuoka, S. 1998. Pegasus: a drawing system for rapid geometric design. In *CHI 98 conference summary on Human factors in computing systems*, ACM, 24-25.

[14] Igarashi, T., Matsuoka, S., and Tanaka, H. 1999. Teddy: a sketching interface for 3d freeform design. In *Proceedings of the 26th annual conference on Computer graphics and interactive techniques*, ACM Press/Addison-Wesley Publishing Co., 409-416.

[15] Jiang, N., Tan, P., and Cheong, L. 2009. Symmetric architecture modeling with a single image. *ACM Transactions on Graphics (TOG)* 28, 5,113.

[16] Kaplan, M., and Cohen, E. 2006. Producing models from drawings of curved surfaces. In *EUROGRAPHICS workshop on sketch-based interfaces and modeling*, The Eurographics Association, 51-58.

[17] Kim, M., Park, E., and Lee, H. 1994. Modelling and animation of generalized cylinders with variable radius offset space curves. *The Journal of Visualization and Computer Animation* 5,4, 189-207.

[18] Lalonde, J., Hoiem, D., Efros, A., Rother, C., Winn, J., and Criminisi, A. 2007. Photo clip art. In *ACM Transactions on Graphics (TOG)*, vol. 26, ACM, 3.

[19] Lau, M., Saul, G., Mitani, J., and Igarashi, T. 2010. Modeling-in-context: User design of complementary objects with a single photo. In *Proceedings of the Seventh Sketch-Based Interfaces and Modeling Symposium*, Eurographics Association, 17-24.

[20] Lee, J. 2005. Modeling generalized cylinders using direction map representation. *Computer-Aided Design* 37, 8, 837-846.

[21] Li, Y., Wu, X., Chrysathou, Y., Sharf, A., Cohen-Or, D., and Mitra, N. 2011. Globfit: Consistently fitting primitives by discovering global relations. In *ACM Transactions on Graphics (TOG)*, vol. 30, ACM, 52.

[22] Murugappan, S., Liu, H., Ramani, K., et al. 2012. Shape-it-up: Hand gesture based creative expression of 3d shapes using intelligent generalized cylinders. *Computer-Aided Design*.

[23] Oh, B., Chen, M., Dorsey, J., and Durand, F. 2001. Image-based modeling and photo editing. In *Proceedings of the 28th annual conference on Computer graphics and interactive techniques*, ACM, 433-442.

[24] Olsen, L., Samavati, F., Sousa, M., and Jorge, J. 2009. Sketch-based modeling: A survey. *Computers & Graphics* 33, 1, 85-103.

[25] Russell, B., and Torralba, A. 2009. Building a database of 3d scenes from user annotations. In *Computer Vision and Pattern Recognition*, 2009. CVPR 2009. *IEEE Conference on, IEEE*, 2711-2718.

[26] Seitz, S., Curless, B., Diebel, J., Scharstein, D., and Szeliski, R. 2006. A comparison and evaluation of multi-view stereo reconstruction algorithms. In *Computer Vision and Pattern Recognition*, 2006 *IEEE Computer Society Conference on*, vol. 1, IEEE, 519-528.

[27] Shtuf, A., Agathos, A., Gingold, Y., Shamir, A., and Cohen-Or, D. 2013. Geosemantic snapping for sketch-based modeling. In *Eurographics*.

[28] Snavely, N. 2011. Scene reconstruction and visualization from internet photo collections: A survey. *IPSJ Transactions on Computer Vision and Applications* 3, 0, 44-66.

[29] Tsang, S., Balakrishnan, R., Singh, K., and Ranjan, A. 2004. A suggestive interface for image guided 3d sketching. In *Proceedings of the SIGCHI conference on Human factors in computing systems*, ACM, 591-598.

[30] Xu, K., Zheng, H., Zhang, H., Cohen-Or, D., Liu, L., and Xiong, Y. 2011. Photo-inspired model-driven 3d object modeling. In *ACM Transactions on Graphics (TOG)*, vol. 30, ACM, 80.

[31] Xu, K., Zhang, H., Cohen-Or, D., and Chen, B. 2012. Fit and diverse: Set evolution for inspiring 3d shape galleries. *ACM Transactions on Graphics (TOG)* 31, 4, 57.

[32] Xue, T., Liu, J., and Tang, X. 2010. Object cut: Complex 3d object reconstruction through line drawing separation. In *Computer Vision and Pattern Recognition (CVPRs)*, 2010 *IEEE Conference on*, IEEE, 1149-1156.

[33] Yoon, S., and Kim, M. 2006. Sweep-based freeform deformations. In *Computer Graphics Forum*, vol. 25, Wiley Online Library, 487-496.

[34] Zeleznik, R., Herndon, K., and Hughes, J. 2007. Sketch: an interface for sketching 3d scenes. In *ACM SIGGRAPH 2007 courses*, ACM, 19.

[35] Zheng, Y., Fu, H., Cohen-Or, D., Au, 0., and Tai, C. 2011. Component-wise controllers for structure-preserving shape manipulation. In *Computer Graphics Forum*, vol. 30, Wiley Online Library, 563-572.

[36] Zheng, Y., Chen, X., Cheng, M., Zhou, K., Hu, S., and Mitra, N. 2012. Interactive images: cuboid proxies for smart image manipulation. *ACM Transactions on Graphics (TOG)* 31, 4, 99.

[37] Zhou, S., Fu, H., Liu, L., Cohen-Or, D., and Han, X. 2010. Parametric reshaping of human bodies in images. *ACM Transactions on Graphics (TOG)* 29, 4, 126.

What is claimed is:

1. A method of obtaining a three-dimensional digital model of an artificial object, the artificial object made up of a plurality of two-dimensional geometric primitives, the artificial object being in a single two-dimensional photograph or drawing in a plane, the method comprising:
    defining a two-dimensional outline of said artificial object within the photograph or drawing;
    interactively allowing a user to define cross-sectional profiles of successive ones of said geometric primitives within said artificial object, said cross-sectional profiles being perpendicular to said plane, thereby defining a third dimension relative to said photograph or drawing;
    interactively allowing a user to provide sweep input to define sweeps of respectively defined cross-sectional profiles along extents of corresponding ones of said two-dimensional geometric primitives within the artificial object, said sweeps being defined in respective directions parallel to said plane;
    carrying out sweeping of said cross-sectional profiles along said extents parallel to said plane according to said sweep input;
    dynamically adjusting said profiles using a pictorial context on the photograph or drawing and automatically snapping photograph lines to said profiles during said sweeping;
    said sweeping generating successive thee-dimensional model primitives from existing detected edges of said corresponding two-dimensional geometric primitives and said sweeping of said respective profiles; and
    aligning said plurality of three-dimensional model primitives to form said three-dimensional model.

2. The method of claim 1, comprising interactively allowing said user to explicitly define three dimensions of the geometric primitive using three sweep motions, wherein a first two of said three sweeps define a first and second dimension of said cross-sectional profile and a third sweep defines a main axis of the geometric primitive.

3. The method of claim 2, comprising snapping said first two user sweep motions to said photograph lines, using the endpoints of said first two user sweep motions along with an anchor point on a respective primitive to create three-dimensional orthogonal system for a respective primitive.

4. The method of claim 1, wherein said snapping allows said three-dimensional model to include three-dimensional primitives that adhere to the object in the photographs, while maintaining global constraints between said plurality of three-dimensional model primitives composing said object.

5. The method of claim 4, further comprising optimizing said global constraints while taking into account said snapping and said sweep input.

6. The method of claim 4, further comprising a post snapping fit improvement of better fitting the primitive to the photograph, said better fitting comprising searching for transformations within ±10% of primitive size, that create a better fit of the primitive's projection to said profile.

7. The method of claim 4, comprising applying different constraints to different parts respectively of a given one of said geometric primitives, or locally modifying different parts respectively of a given one of said geometric primitives.

8. The method of claim 1, wherein said defining said two dimensional outline comprises edge detecting.

9. The method of claim 1, further comprising estimating a field of view angle from which said photograph was taken in order to estimate and compensate for distortion of said primitives within said photograph.

10. The method of claim 1, further comprising using relationships between said geometric primitives in order to define global constraints for said object.

11. The method of claim 10, further comprising obtaining geo-semantic relations between said geometric primitives to define said three-dimensional model, and encoding said relations as part of said model.

12. The method of claim 1, further comprising inserting said three-dimensional model into a second photograph.

13. The method of claim 1, further comprising extracting a texture from said photograph and applying said texture to sides of said three-dimensional model not visible in said photograph.

14. The method of claim 1, wherein said defining said cross-sectional profiles comprises defining a shape and then distorting said shape to correspond to a three-dimensional orientation angle.

15. The method of claim 1, further comprising supporting a constraint, said constraint being one member of the group consisting of: parallelism, orthogonality, collinear axis endpoints, overlapping axis endpoints, coplanar axis endpoints and coplanar axes, and for said member testing whether a pair of components satisfies said member, and if said member is satisfied then adding said constraint to a respective one of said components.

16. The method of claim 1, wherein said aligning said three dimensional primitives comprises finding an initial position for all primitives together by changing only their depth to adhere to geo-semantic constraints, followed by modifying shapes of the primitives.

17. A method of forming a derivation of a photograph or drawing, the photograph incorporating a two dimensional representation of a three-dimensional object, said three-dimensional object comprising geometric primitives, the two-dimensional representation being a rotation or other transformation of an original two-dimensional representation, the rotation being formed by:
    carrying out the method of claim 1 to form a three-dimensional model of said original two-dimensional representation;
    rotating or otherwise transforming said three-dimensional model; and
    projecting said rotated or otherwise transformed three-dimensional model onto a two-dimensional surface to form said derivation.

\* \* \* \* \*